US009845916B2

(12) United States Patent
Allidieres

(10) Patent No.: US 9,845,916 B2
(45) Date of Patent: Dec. 19, 2017

(54) STATION AND METHOD FOR FILLING GAS TANKS

(71) Applicant: L'Air Liquide, Societe Anonyme pour l'Etude et l'Exploitation des Procedes Georges Claude, Paris (FR)

(72) Inventor: Laurent Allidieres, Saint Martin D'Uriage (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 42 days.

(21) Appl. No.: 14/903,005

(22) PCT Filed: May 28, 2014

(86) PCT No.: PCT/FR2014/051276
§ 371 (c)(1),
(2) Date: Jan. 5, 2016

(87) PCT Pub. No.: WO2015/001209
PCT Pub. Date: Jan. 8, 2015

(65) Prior Publication Data
US 2016/0153615 A1    Jun. 2, 2016

(30) Foreign Application Priority Data
Jul. 5, 2013 (FR) ..................... 13 56620

(51) Int. Cl.
*F17C 5/06* (2006.01)
*F17C 5/00* (2006.01)

(52) U.S. Cl.
CPC ............... *F17C 5/06* (2013.01); *F17C 5/007* (2013.01); *F17C 2221/012* (2013.01);
(Continued)

(58) Field of Classification Search
CPC ...... F17C 5/06; F17C 5/007; F17C 2221/012; F17C 2223/0123; F17C 2223/033;
(Continued)

(56) References Cited

U.S. PATENT DOCUMENTS

| 7,987,877 B2 * | 8/2011 | Bavarian ................... F17C 7/00 137/255 |
| 8,671,997 B2 * | 3/2014 | Allidieres ................. F17C 5/06 141/104 |

(Continued)

FOREIGN PATENT DOCUMENTS

| FR | 2 919 375 | 1/2009 |
| FR | 2 928 716 | 9/2009 |

(Continued)

OTHER PUBLICATIONS

French Search Report and Written Opinion for FR 1 356 620, dated Apr. 1, 2014.
(Continued)

*Primary Examiner* — Timothy L Maust
(74) *Attorney, Agent, or Firm* — Christopher J. Cronin

(57) ABSTRACT

Method for filling a tank with pressurized hydrogen via a filling station comprising at least one buffer container and a fluid circuit connected to said at least one buffer container, the circuit of the filling station comprising a first end connected to at least one source of hydrogen gas, the circuit comprising a second end fitted with a transfer pipe intended to be connected removably to the tank that is to be filled, the method involving a step of purifying the hydrogen supplied by the source in a purification member before transferring same to the at least one buffer container, the circuit of the filling station further comprising at least one compression member for compressing the pressurized gas in order to fill the at least one buffer container, the method being characterized in that it comprises a step of transferring heat energy
(Continued)

between, on the one hand, the compressed gas of the outlet from the compression member and, on the other hand, the purification member.

11 Claims, 1 Drawing Sheet

(52) U.S. Cl.
CPC   *F17C 2223/0123* (2013.01); *F17C 2223/033* (2013.01); *F17C 2225/0123* (2013.01); *F17C 2225/036* (2013.01); *F17C 2227/0157* (2013.01); *F17C 2227/0185* (2013.01); *F17C 2227/0348* (2013.01); *F17C 2227/0355* (2013.01); *F17C 2227/0365* (2013.01); *F17C 2227/0388* (2013.01); *F17C 2227/043* (2013.01); *F17C 2250/01* (2013.01); *F17C 2260/046* (2013.01); *F17C 2265/01* (2013.01); *F17C 2265/015* (2013.01); *F17C 2265/065* (2013.01); *F17C 2270/0139* (2013.01); *Y02E 60/321* (2013.01); *Y02E 60/324* (2013.01); *Y02P 90/45* (2015.11)

(58) Field of Classification Search
CPC ........ F17C 2225/0123; F17C 2225/036; F17C 2225/0365; F17C 2227/0365; F17C 2227/0388; F17C 2227/043; F17C 2250/01; F17C 2260/046; F17C 2265/01; F17C 2265/015; F17C 2270/0139

USPC ............................................. 141/12, 69, 95
See application file for complete search history.

(56)  References Cited

U.S. PATENT DOCUMENTS

| 8,978,715 | B2  |   | 3/2015 | Allidieres |            |
|-----------|-----|---|--------|------------|------------|
| 9,435,488 | B2  |   | 9/2016 | Nagura et al. |         |
| 9,618,159 | B2  | * | 4/2017 | Gouv a ........... | F17C 5/06 |
| 2005/0109419 | A1 | * | 5/2005 | Ohmi .............. | B01D 53/46 |
|           |     |   |        |            | 141/4 |
| 2013/0126038 | A1 | * | 5/2013 | Jamal ............. | H01M 8/0618 |
|           |     |   |        |            | 141/5 |

FOREIGN PATENT DOCUMENTS

| FR | 2 960 041 | 11/2011 |
| FR | 2 973 858 | 10/2012 |
| WO | WO 2012/147340 | 11/2012 |

OTHER PUBLICATIONS

International Search Report and Written Opinion for PCT/FR2014/051276, dated Feb. 9, 2015.
International Search Report and Written Opinion for PCT/FR2014/051264, dated Feb. 9, 2015.
French Search Report and Written Opinion for FR 1 356 618, dated Apr. 1, 2014.

* cited by examiner

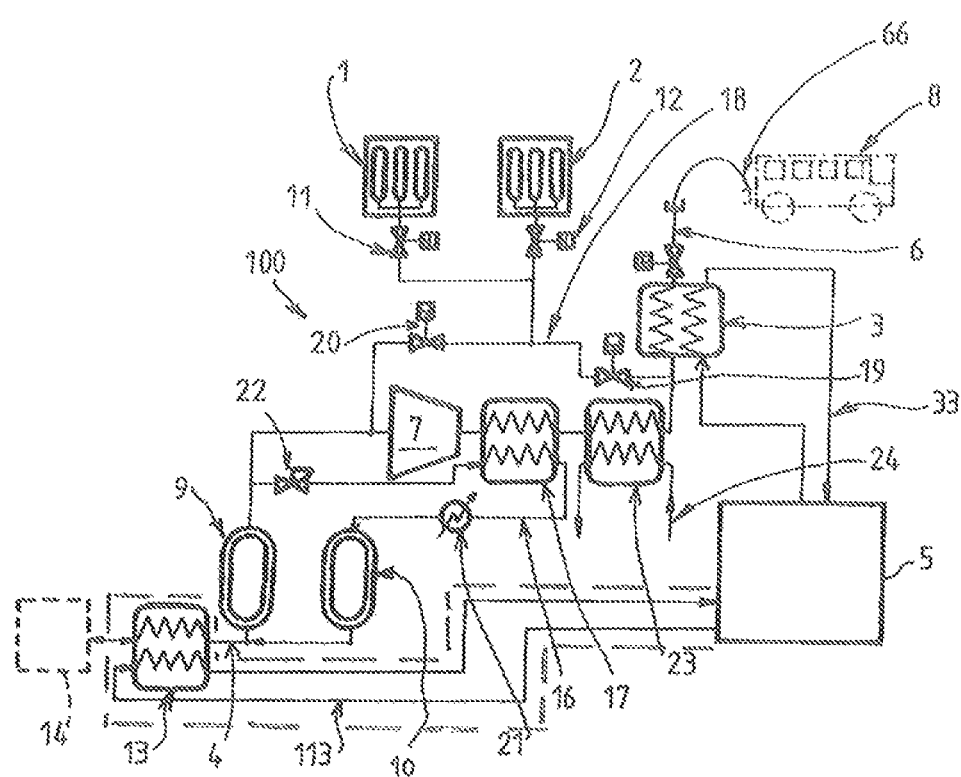

STATION AND METHOD FOR FILLING GAS TANKS

CROSS-REFERENCE TO RELATED APPLICATIONS

This application is a §371 of International PCT Application PCT/FR2014/051276, filed May 28, 2014, which claims §119(a) foreign priority to French patent application FR1356620, filed Jul. 5, 2013.

BACKGROUND

Field of the Invention

The present invention relates to a method and station for filling gas tanks.

More particularly, the invention relates to a method of filling a tank with pressurized hydrogen via a filling station comprising at least one buffer container and a fluid circuit connected to said at least one buffer container, the circuit of the filling station comprising a first end connected to at least one source of gaseous hydrogen for carrying out the filling of the at least one buffer container with gas originating from the source, the circuit comprising a second end equipped with a transfer pipe intended to be removably connected to the tank to be filled, in order to fill the latter with hydrogen originating from the at least one buffer container, the method comprising a step of purifying the hydrogen supplied by the source in a purification component before it is transferred to the at least one buffer container, the circuit of the filling station additionally comprising at least one compression component for compressing pressurized gas in order to fill the at least one buffer container.

Related Art

The fast filling (typically in less than 15 minutes) of tanks of fuel gas (hydrogen in particular) at high pressure (300 to 800 bar for example) is generally carried out by successive equalizations between buffer containers at high pressure (for example 200, 300, 450 or 850 bar) and the tank to be filled. This filling may, where necessary, be complemented or supplemented by one or more compressors.

In order to limit the increase in temperature in the tanks due to the adiabatic nature of the compression, the fuel gas is cooled, for example to a temperature of the order or −40° C. before it enters the tank. This cooling is generally carried out via a heat exchanger supplied with a refrigerant or cryogenic fluid. These methods are described abundantly in the literature.

Reference may for example be made to documents FR 2919375 A1, FR 2973858 A1 and FR 2919375 A1 that describe filling stations to which the present invention may apply.

The fuel cells in particular of "PEMFC" type installed on board vehicles that use this hydrogen fuel must be supplied with a very pure hydrogen. A wealth of literature has described the impacts of impurities (such as water, CO, $H_2S$) in the hydrogen on the performance and service life of the fuel cells. Strict standards have thus been developed to ensure that the hydrogen delivered to the tanks does not damage the cells (cf. for example the ISO 14687-2 standard).

The known and relatively inexpensive industrial manufacturing processes do not make it possible to ensure such a degree of purity continuously.

In order to guarantee a degree of purity of the hydrogen, it may be necessary to add, upstream of the filling stations, extremely expensive purification steps, such as purifications over a bed of adsorbent operating at cryogenic temperature or palladium membranes.

Another solution consists in supplying the filling station with hydrogen that is liquid, and therefore very pure, or via electrolyzers. These solutions are however expensive.

SUMMARY OF THE INVENTION

One object of the present invention is to alleviate all or some of the abovementioned disadvantages of the prior art.

For this purpose, the method according to the invention, furthermore in accordance with the generic definition given in the preamble above, is essentially characterized in that it comprises a step of transferring calories between, on the one hand, the compressed gas at the outlet of the compression component and, on the other hand, the purification component.

This makes it possible to use a source of hydrogen a priori incompatible with the specifications of the fuel cells in a filling station by using a purification system of standard or non-standard technology that is fully integrated into the station.

The use of the calories produced in the filling station during the compression of the hydrogen in the operation of the purification component allows a saving to be made and enables a particularly effective operation of the station.

Moreover, some embodiments of the invention may comprise one or more of the following features:

- the purification component operates according to a cycle comprising a gas purification phase and a regeneration phase, the step of transferring calories between the compressed gas at the outlet of the compression component and the purification component being carried out during the regeneration phase of the purification component,
- the purification step uses at least one temperature and pressure swing adsorption (TPSA) separation device,
- the selective transfer of calories from the compressed gas at the outlet of the compression component to the purification component uses a heat exchanger in thermal exchange with the gas at the outlet of the compression component and a heat transfer fluid pipe selectively connecting said heat exchanger to the purification component and/or gas entering the purification component,
- the purification component comprises a pressure swing adsorption (PSA, TPSA) separation device comprising several beds of adsorbent of activated carbon or molecular sieve type operating cyclically and alternately,
- the circuit comprises a transfer pipe equipped with a valve and connecting two beds of adsorbent in order to purge a first bed of adsorbent with gas from a second bed of adsorbent and vice versa, in order to enable a step of elution of the bed(s) of adsorbent in a regeneration phase, the transfer of calories between, on the one hand, the compressed gas at the outlet of the compression component and, on the other hand, the purification component comprising a heat exchange between, on the one hand, the gas at the outlet of the component and, on the other hand, the gas from the second bed of adsorbent that is intended to purge the first bed,
- the method comprises a step of transferring calories between, on the one hand, an additional reheating component and the purification component and/or the gas entering the latter, the method comprises a step of transferring calories between the additional reheating component and the gas from the second bed of adsorbent that is intended to purge the first bed.

The invention also relates to a filling station for a pressurized gaseous hydrogen tank comprising at least one buffer container provided in order to contain pressurized gaseous hydrogen, a fluid circuit comprising a plurality of valves, the circuit being connected to said at least one buffer container and comprising a first end intended to be connected to at least one source of gaseous hydrogen for enabling the filling of the at least one buffer container with gas supplied by the at least one source, the circuit comprising a second end comprising a filling pipe intended to be removably connected to a tank in order to fill said tank from the at least one buffer container, the circuit of the filling station comprising at least one compression component such as a compressor for compressing hydrogen in order to fill the at least one buffer container, the purification component comprising one or more beds of adsorbent of pressure swing adsorption type operating according to a cycle comprising a gas purification phase and a regeneration phase, the station comprising a circuit for selective transfer of calories from compressed gas at the outlet of the compression component to the purification component.

According to other possible specific features:
the circuit for selective transfer of calories from compressed gas at the outlet of the compression component to the purification component comprises a heat exchanger positioned at the outlet of the compression component in thermal exchange, on the one hand, with the compressed hydrogen and, on the other hand, with the purification component and/or gas entering the latter,
the purification component comprises a pressure swing adsorption (PSA) separation device comprising several beds of adsorbent of activated carbon or molecular sieve type operating cyclically and alternately, the circuit comprising a transfer pipe connecting the beds to one another and that is equipped with a valve to enable the purging of a first bed of adsorbent with gas from a second bed of adsorbent and vice versa, so as to carry out a step of elution of the bed(s) of adsorbent in a regeneration phase and in that the circuit for selective transfer of calories from the compressed gas at the outlet of the compression component to the purification component comprises a heat exchange between the transfer pipe and said heat exchanger positioned at the outlet of the compression component.

The invention may also relate to any alternative device or method comprising any combination of the features above or below.

BRIEF DESCRIPTION OF THE FIGURES

Other specific features and advantages will become apparent from reading the following description given with reference to the single FIGURE which represents a schematic and partial view illustrating the structure and the operation of a filling station according to one possible exemplary embodiment of the invention.

DETAILED DESCRIPTION OF THE INVENTION

The filling station 100 represented by way of nonlimiting example is a station provided in order to carry out the filling of tanks 8 of gaseous hydrogen at high pressure (for example at a pressure between 300 and 850 bar).

Conventionally, the filling station 100 comprises several buffer containers 1, 2 (two in this nonlimiting example but there may be one, three or more than three thereof).

Each buffer container 1, 2 is a tank or set of tanks provided in order to contain gaseous hydrogen pressurized to a given pressure, for example respectively 450 bar and 850 bar. The station 100 comprises a fluid circuit 11, 12, 18, 4, 6 comprising a plurality of pipes and valves. The circuit is connected to the buffer containers 1, 2. The circuit comprises a first end 4 intended to be connected to at least one source 14 of gaseous hydrogen in order to enable the filling of the buffer containers 1, 2 with gas originating from the source 14.

The source 14 of hydrogen may conventionally comprise at least one from among: a network of hydrogen gas at a pressure between 1.3 bar abs (bar absolute) and 200 bar abs and a component for producing hydrogen such as an electrolyzer, a natural gas reformer ("SMR"), a methanol cracking device, an autothermal reforming ("ATR") device, a partial oxidation ("PDX") device, etc.

The circuit comprises a second end equipped with at least one filling pipe 6 intended to be removably connected (via an appropriate connector 66) to a tank 8 to be filled.

More specifically, the buffer containers 1, 2 are connected in parallel, via respective valves 11, 12, to the filling pipe 6.

Similarly, one, two or more than two gas sources 14 may be connected in parallel via respective valves to the filling pipe 6 (at the first end).

The filling pipe 6 may comprise, upstream of the connector 66, a compressor 7. Several compressors in parallel or in series may of course also be envisaged.

The compressor 7 may be equipped with an upstream valve and a downstream valve (not represented for the sake of simplification).

As represented, a bypass pipe 18 for bypassing the compressor 7 may be provided. The bypass pipe 18 may comprise two valves 20 and 19 and may be the collecting pipe that connects the buffer containers 1, 2 to the filling pipe 6.

This bypass pipe 18 also enables the filling of the buffer containers 1, 2 via the compressor 7.

The station 100 also comprises, at the first end 4, a component 9, 10 for purifying the hydrogen supplied by the source, preferably upstream of the compressor 7. The purification component preferably comprises a known temperature and pressure swing adsorption (TPSA) separation device, comprising one and preferably several beds of adsorbent. For example, and as represented, the purification component 9, 10 comprises two beds of adsorbent (zeolites or others) positioned in parallel in the circuit. The gas supplied by the source 14 is admitted alternately into one then the other of the adsorbents 9, 10 by a system of valves, the adsorbents 9, 10 operating alternately (regeneration of one at high temperature and low pressure during the adsorption of the other at low temperature and high pressure). For example, it may be a TSA with a coaxial bed using molecular sieves or activated carbons. For reasons of simplification of the FIGURE, all the valves necessary for the decrease in pressure or the increase in temperature of the tanks 9 and 10 and also the transition into production mode from one adsorber to the other are not represented (system known per se).

For this purpose, and as represented in the FIGURE, the circuit may comprise, in a manner known per se, a transfer pipe 16 connecting a first bed of adsorbent 9 to a second bed 10 of adsorbent (and vice versa, another transfer pipe that is not represented in the FIGURE for the sake of simplification may connect the two adsorbents 9, 10 in order to enable the reverse procedure). This transfer pipe 16 is equipped with a valve 22 that makes it possible to control the pressure and the flow rate for regeneration of the tank 10. The transfer pipe 16 is provided in order to enable the purging of an adsorber 9 with gas (hydrogen) from the other absorber 10 (and vice versa), to carry out a step of elution of the adsorber 10 in a regeneration phase.

According to one advantageous specific feature, the station comprises a circuit 16, 17 for selective transfer of calories from gas compressed in the compressor 7 to the purification component 9, 10.

The purification component 9, 10 may in particular require, where necessary, a temporary reheating, for example adsorbents of TSA type may require a reheating during the regeneration phase (temperature for example between 200 and 300° C.).

As illustrated in the FIGURE, this circuit 16, 17 for selective transfer of calories may comprise a heat exchanger 17 positioned at the outlet of the compressor 7 in thermal exchange, on the one hand, with the hydrogen and, on the other hand, with the transfer pipe(s) 16. That is to say that the purge gas from a first bed 9 of adsorbent undergoes heat exchange with the compressed gas before purging the second bed 10 of adsorbent. In this way, the purge gas used during the regeneration of an adsorbent 9, 10 is reheated in order to improve the efficiency of the regeneration of the adsorbent.

This makes it possible to reheat the adsorbent 9, 10 during its regeneration phase while cooling the gas leaving the compressor 7. If necessary, in addition to the heat exchanger 17, the circuit may comprise a supplementary cooling exchanger 23 for cooling the compressed gas. For example, this exchanger 23 is supplied with refrigerant fluid, for example via a water circuit 24.

Of course, as a variant or in combination, calories from the compressed gas may be transferred directly to the adsorbent 9, 10 in regeneration phase (via a different heat-transfer fluid for example).

Of course, a reheater 21 is preferably installed in order to supplement the reheating during the regeneration (the hydrogen is for example reheated at the outlet of the compressor 7 to a temperature of 100° C. approximately whereas a higher temperature is generally necessary for the regeneration, for example 200° C.). This additional reheater 21 may also be positioned in the transfer pipe 6, in series with the heat exchanger 17 described above.

The recovery and the use of calories produced during the compression as described above makes it possible to reduce the reheating power of the additional reheater 21.

As illustrated in the FIGURE, the station 100 may additionally comprise, at the transfer pipe 6, a system of selective cooling (i.e. a controlled cooling) of the gas supplied to the tank 8 (for example the hydrogen is cooled to a low temperature of between −196° C. and −40° C.). As represented in the FIGURE, this cooling may be carried out conventionally by a first cooling exchanger 3 in thermal exchange with the gas of the circuit and a loop 33 for circulation of heat transfer fluid between a cold source 5 and the first heat exchanger 3. Conventionally, this circulation loop 33 may comprise valves and/or pumps which are not represented for the sake of simplification.

The cold source 5 may comprise at least one from among: a reserve of liquefied gas such as nitrogen, ethylene glycol in aqueous solution at various mass concentrations, ammonia solution, propane, or a conventional refrigerant.

As illustrated in a zone delimited by dotted lines, the station 100 may in addition optionally comprise a selective transfer of negative calories (selective is to say which preferably can be controlled in intensity according to the refrigeration requirements) between the cold source 5 and gas before or during the purification step. For this purpose, the station 100 may comprise a second cooling exchanger 13 in thermal exchange with the gas at the inlet of the purification component 9, 10 and a loop 113 for circulation of heat transfer fluid between the cold source 5 and the second heat exchanger 3.

This cooling of the gas and/or of the purification component 9, 10 may be particularly advantageous for the efficiency of the latter, in particular for temperature swing adsorption (TSA) purification devices during the purification phase (during passage of the gas into the adsorbent and adsorption of the impurities).

The cold source 5 may thus be mutualized within the station 100 in order to improve the efficiency and the cost of the assembly.

This architecture ensures an efficient economic operation of the station 100.

The operation of the filling station 100 may comprise two separate phases.

In a first operating phase, the buffer container(s) 1,2 may be filled. The gaseous hydrogen supplied by the source 14 is purified in the purification component 9, 10 then compressed and injected into the buffer containers 1, 2. The filling switches from one container 1, 2 to the other may be carried out when the pressure in the filled container 1, 2 reaches its nominal pressure (typically between 450 and 850 bar). A filling of a buffer container 1, 2 may begin for example when the pressure within it passes below a threshold (for example respectively 350 and 700 bar). The steps are not necessarily consecutive. During this first phase, the cold source 5 supplies cooling power to the second heat exchanger 13.

In a second operating phase, one or some tank(s) 8 are filled by the station 100. For example, a tank 8 is filled up to a pressure of 700 bar. The tank 8 is equalized successively with the buffer containers 1, 2. The switching from one buffer container 1, 2 to the other may be carried out when the pressure difference between the buffer container 1, 2 and the destination tank 8 is below a predefined threshold. Depending on the initial pressure in the tank 8, pressure equalization steps may be omitted. In a known manner, if necessary, the compressor 7 may complement or supplement this filling. During this second phase, the cold source 5 supplies cooling power to the first heat exchanger 3.

As a variant, a heat exchanger (not represented) may be optionally provided at the inlet of the compressor 7 in order, where necessary, to reheat the gas if the compressor does not tolerate cold gas.

The invention makes it possible to reduce the cost, the overall dimensions and the energy consumption of the filling station.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of filling a tank with pressurized hydrogen via a filling station comprising at least one buffer container and a fluid circuit connected to said at least one buffer container, the circuit of the filling station comprising a first end connected to at least one source of gaseous hydrogen for carrying out the filling of the at least one buffer container with gas originating from the source, the circuit comprising a second end equipped with a transfer pipe intended to be removably connected to the tank to be filled, in order to fill the latter with hydrogen originating from the at least one buffer container, the method comprising the steps of:
   purifying the hydrogen supplied by the source in a purification component before it is transferred to the at least one buffer container, the circuit of the filling station additionally comprising at least one compression component for compressing pressurized gas in order to fill the at least one buffer container;
   transferring calories between, on the one hand, the compressed gas at the outlet of the compression component and, on the other hand, the purification component; and
   filling the tank with the pressurized hydrogen from the at least one buffer container.

2. The method of claim 1, wherein the purification component operates according to a cycle comprising a gas purification phase and a regeneration phase and in that the step of transferring calories between the compressed gas at the outlet of the compression component and the purification component is carried out during the regeneration phase of the purification component.

3. The method of claim 1, wherein the purification step uses at least one temperature and pressure swing adsorption (TPSA) separation device.

4. The method of claim 1, wherein the selective transfer of calories from the compressed gas at the outlet of the compression component to the purification component uses a heat exchanger in thermal exchange with the gas at the outlet of the compression component and a heat transfer fluid pipe selectively connecting said heat exchanger to the purification component and/or gas entering the purification component.

5. The method of claim 1, wherein the purification component comprises a pressure swing adsorption (PSA) separation device comprising several beds of adsorbent of activated carbon or molecular sieve type operating cyclically and alternately.

6. The method of claim 5, wherein the circuit comprises two beds of adsorbent positioned in parallel, the circuit comprising a first transfer pipe and a second transfer pipe that are each equipped with a valve and that connect two beds of adsorbent in order to purge a first bed of adsorbent with gas from a second bed of adsorbent and vice versa, in order to enable a step of elution of the bed(s) of absorbent in a regeneration phase and in that the transfer of calories between, on the one hand, the compressed gas at the outlet of the compression component and, on the other hand, the purification component comprises a heat exchange between, on the one hand, the gas at the outlet of the compression component and, on the other hand, the gas from one bed of adsorbent that is intended to purge the other bed.

7. The method of claim 1, wherein it comprises a step of transferring calories between, on the one hand, an additional reheating component and the purification component and/or the gas entering the latter.

8. The method of claim 6, wherein it comprises a step of transferring calories between the additional reheating component and the gas from the second bed of adsorbent that is intended to purge the first bed.

9. A filling station for a pressurized gaseous hydrogen tank comprising:
   at least one buffer container provided in order to contain pressurized gaseous hydrogen;
   a fluid circuit comprising a plurality of valves, the circuit being connected to said at least one buffer container and comprising:
      a first end intended to be connected to at least one source of gaseous hydrogen for enabling the filling of the at least one buffer container with gas supplied by the at least one source,
      a second end comprising a filling pipe intended to be removably connected to the pressurized gaseous hydrogen tank in order to fill said tank from the at least one buffer container, and
      at least one compression component such as a compressor for compressing hydrogen in order to fill the at least one buffer container;
   a purification component comprising one or more beds of adsorbent of pressure swing adsorption (PSA) type operating according to a cycle comprising a gas purification phase and a regeneration phase; and
   a circuit for selective transfer of calories from compressed gas at the outlet of the compression component to the purification component.

10. The station of claim 9, wherein the circuit for selective transfer of calories from compressed gas at the outlet of the compression component to the purification component comprises a heat exchanger positioned at the outlet of the compression component in thermal exchange, on the one hand, with the compressed hydrogen and, on the other hand, with the purification component and/or gas entering the latter.

11. The station of claim 10, wherein the purification component comprises a pressure swing adsorption (PSA) separation device comprising several beds of adsorbent of activated carbon or molecular sieve type operating cyclically and alternately, and in that the circuit comprises a transfer pipe connecting the beds to one another and that is equipped with a valve to enable the purging of a first bed of adsorbent with gas from a second bed of adsorbent and vice versa, so as to carry out a step of elution of the bed(s) of adsorbent in a regeneration phase and in that the circuit for selective transfer of calories from the compressed gas at the outlet of the compression component to the purification component comprises a heat exchange between the transfer pipe and said heat exchanger positioned at the outlet of the compression component.

* * * * *